D. O. WARD.
LOCKING NUT.
APPLICATION FILED FEB. 27, 1911.
1,041,920.
Patented Oct. 22, 1912.
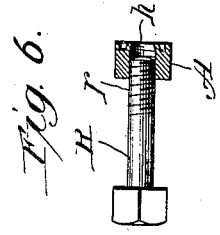
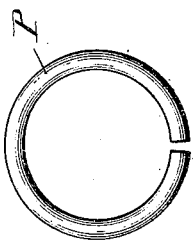
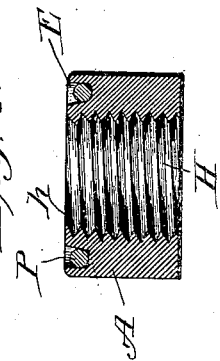
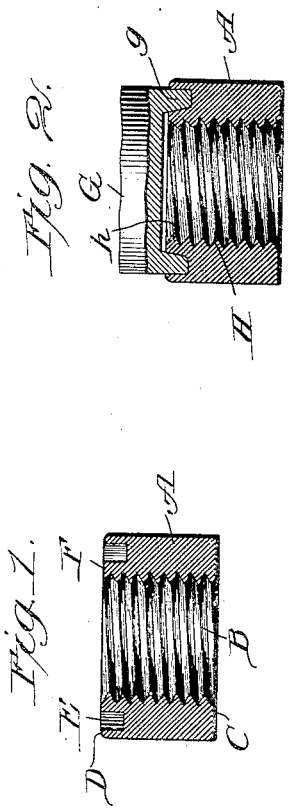
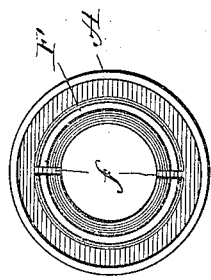
WITNESSES
INVENTOR

UNITED STATES PATENT OFFICE.

DANIEL O. WARD, OF OAK PARK, ILLINOIS.

LOCKING-NUT.

1,041,920.   Specification of Letters Patent.   Patented Oct. 22, 1912.

Application filed February 27, 1911. Serial No. 611,016.

*To all whom it may concern:*

Be it known that I, DANIEL O. WARD, a citizen of the United States, residing at Oak Park, county of Cook, State of Illinois, have invented a certain new and useful Improvement in Locking-Nuts, and declare the following to be a full, clear, and exact description of the same, such as will enable others skilled in the art to which it pertains to make and use the same, reference being had to the accompanying drawings, which form a part of this specification.

My invention has for its object to produce a locking nut which shall be simple and practically as cheap as a plain nut, and which may be used indefinitely, its capacity for locking being unimpaired by unscrewing it from its complementary member.

My invention has for a further object to produce a locking nut which will hold itself securely at any point along a bolt or the like while, in starting on the bolt, it runs freely so that it may be started with the fingers.

The various features of novelty whereby my invention is characterized will hereinafter be pointed out with particularity in the claims; but for a full understanding of my invention and of its objects and advantages, reference may be had to the following detailed description taken in connection with the accompanying drawing, wherein:

Figure 1 is a central section taken through a nut, showing the condition of the nut after it has been threaded in the usual way and is ready to be given its locking characteristic; Fig. 2 is a view similar to Fig. 1, illustrating the final step in the production of the nut; Fig. 3 is a plan view of the nut; Fig. 4 is a section through a modified form of nut and Fig. 5 a plan view of the contracting ring used therein; and Fig. 6 is a side view of a bolt having thereon a nut arranged in accordance with my invention, the nut being shown in section.

Referring to Figs. 1 to 3 of the drawing, A represents a nut of any suitable form having a threaded aperture B extending therethrough from the bottom face C to the top of face D. I use the term "bottom" to designate the face at that end of the nut into which the end of the bolt is inserted, the top face being the face on the other side. Before the nut is tapped, I form in its top face a channel or groove, preferably an annular channel E which surrounds the opening in the nut and is spaced apart therefrom so as to produce a thin annular wall F around the upper end of the opening, and lying wholly beneath the adjacent face of the nut. The nut is then tapped in the usual way as shown in Fig. 1. I then bend in the annular wall so as to change the characteristics of one or more of the threads adjacent to the top face of the nut. This may conveniently be accomplished by placing the nut in a press and bringing down on top thereof a die G having an annular depending flange g, which is adapted to enter the channel and press radially upon the exterior of the annular wall so as to reduce it in diameter; thus decreasing the diameter of the threaded aperture at this point. The inward pressure on the wall may be produced in any suitable way, but I prefer to taper either the side walls of the channel in the nut or the corresponding walls of the flange on the die, thus exerting a wedging action upon the annular wall in the radial direction when the die is forced home. In the arrangement shown, the channel is rectangular in cross section and the die-flange is tapered. The smallest interior diameter of the annular flange of the die is less than the external diameter of the annular wall so that, as the die descends, the metal of the wall is compressed inwardly and reduces the diameter of that portion of the screw-threaded aperture inclosed by the wall. This is the condition illustrated in Fig. 2, H being the threads throughout the body of the nut and h representing one or more screw threads near the top which have a smaller diameter than the remaining threads. As will be seen in Fig. 3 the annular wall F is slotted at diametrically opposed points as indicated at f. Consequently, when the die descends, the two sections of the wall are pressed against each other, closing the slots, distortion of the threads being produced by the simple bending action of the two parts of the annular wall.

In Figs. 4 and 5, I have shown a modification. Instead of die-forging the wall F of the nut in Fig. 1 so as to decrease the diameter of the threaded opening at the mouth thereof, I force a ring P into the channel E; the ring being thick enough or wide enough to produce the requisite contraction of the wall in the radial direction.

In this arrangement the ring forms a solid backing for the wall; thus causing the locking threads $h$ to take a tight grip on the threads on a bolt, and permitting the nut to be unscrewed from a bolt an indefinite number of times without having its locking characteristic impaired.

In each form of nut which I have illustrated, the nut may be screwed easily upon a bolt, just as any ordinary nut, until the end of the bolt reaches the threads whose characteristics have been changed. At this point a binding action takes place between the latter threads and the threads of the bolt so that considerable resistance is offered to turning the nut in either direction. This resistance is not so great as to prevent the nut from being screwed home by means of a suitable wrench, but it is great enough to prevent the nut from backing up accidentally after it has reached its final position.

In Fig. 6, R represents a bolt and A a nut arranged in accordance with my invention. In the condition of the parts illustrated, the nut has been partially screwed upon the end of the bolt, the threads $r$ on the bolt being about to encounter the locking threads $h$. Up to this point the nut has had a loose fit upon the bolt; but a further turning of the nut will bring the threads on the bolt into engagement with the locking threads of the nut and considerable force must be applied to turn the nut against the considerable frictional resistance between the locking threads of the nut and the threads of the bolt. The nut can readily be turned by means of a suitable wrench or other power device, but grips the bolt tightly enough to prevent accidental displacement.

It will thus be seen that I have provided a simple and efficient locking nut which requires no special tools for effecting the locking, because certain of its threads normally have different characteristics from the rated threads of the nut. Not only is there convenience of application and certainty of locking, but a nut may be used over and over without having its locking character impaired. Furthermore, the locking characteristic of the nut is produced without materially increasing the cost above the cost of an ordinary plain nut; because the locking character is given to the nut during the course of manufacture and requires but one simple operation in addition to the usual operations necessary to make a nut. While the channels or grooves may be cut in the nuts, it will of course be understood that they may be punched or rolled in the bar while forming it, or pressed into the nut blank and, therefore, the only extra operation required is that of placing the nut after tapping into one additional press which either forges the annular wall or forces a ring or wedge in place behind it.

While I have illustrated and described only the preferred forms of my invention, I do not desire to be limited to the exact details illustrated and described, but intend to cover all forms of my invention which fall within the terms employed in the definitions of my invention constituting the appended claims.

I claim:

1. As an article of manufacture, a nut having a screw-threaded aperture extending therethrough from face to face, there being an annular channel surrounding and spaced apart from said aperture in the face of the nut last to pass upon a coöperating bolt, said channel producing a thin annular wall about said aperture, said wall being divided at one or more points, and a ring pressed into and lying normally in said channel, said ring and said channel being so proportioned that the entry of the ring into the channel bends the parts of the divided wall inwardly so as to reduce the size of the screw-threaded aperture in that portion bounded by the wall.

2. As an article of manufacture, a nut having a screw-threaded aperture extending therethrough from face to face there being in one face of the nut an annular channel surrounding the aperture and spaced apart therefrom so as to produce a narrow annular inner wall lying below the face of the nut and immediately surrounding said aperture and an outer wall surrounding and spaced apart from the inner wall, said inner wall being divided at one or more points, and said outer wall being continuous so as to form a rigid abutment for a wedging member adapted to enter said channel and bend the sections of the inner wall inwardly to reduce the size of the screw-threaded aperture throughout that portion bounded by the inner wall.

In testimony whereof, I sign this specification in the presence of two witnesses.

DANIEL O. WARD.

Witnesses:
ARCHIE L. JOHNSON,
EDW. I. RUTLEDGE.